Patented Apr. 22, 1941

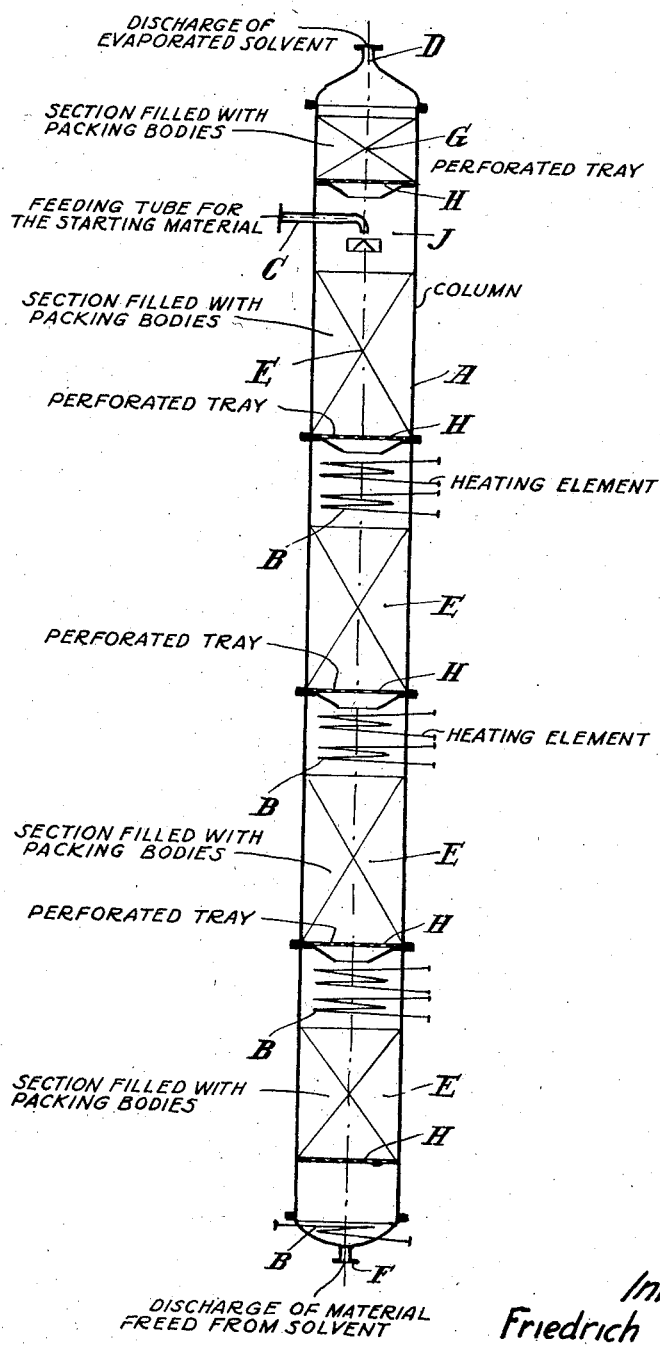

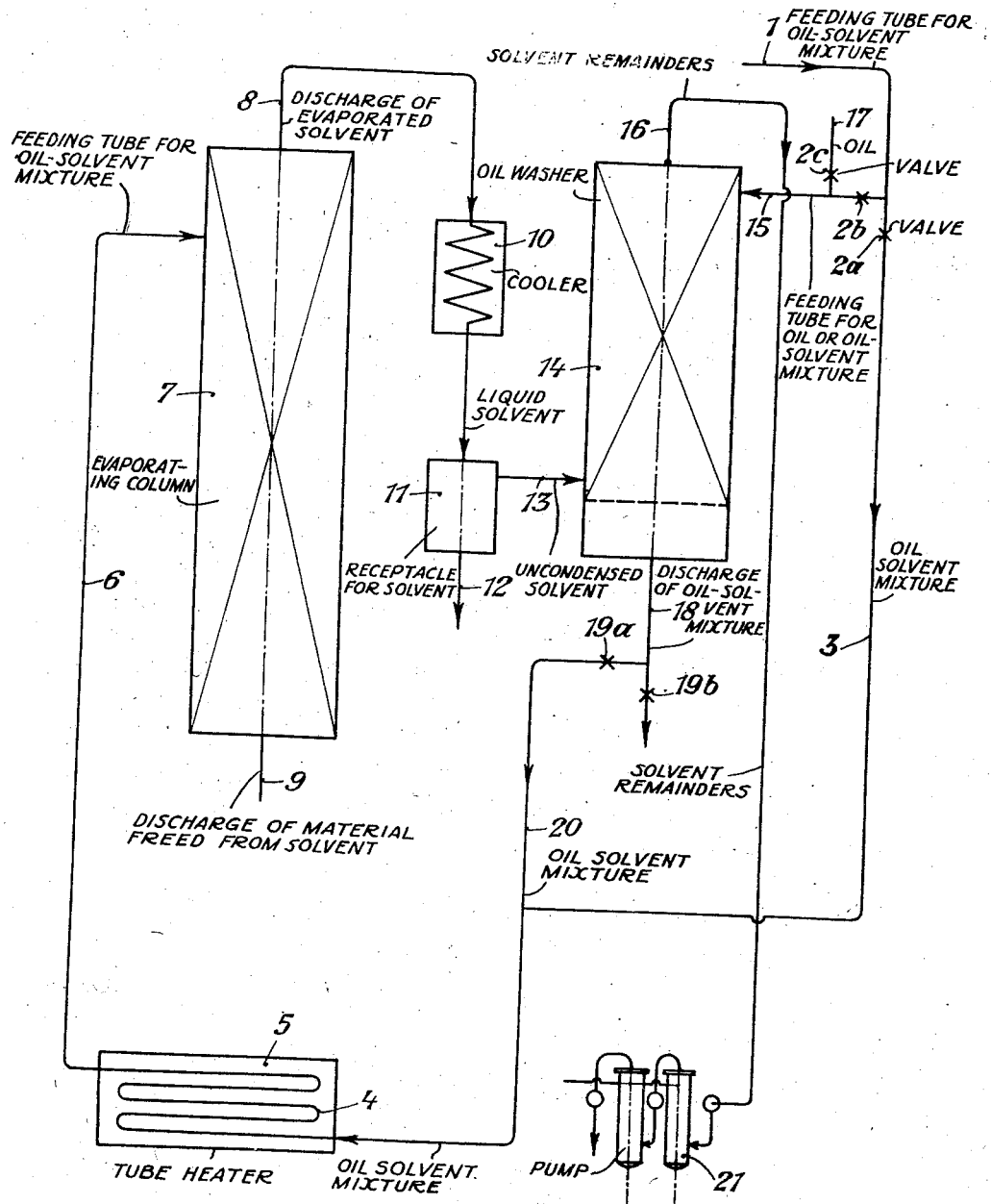

2,239,470

UNITED STATES PATENT OFFICE 2,239,470

PROCESS FOR THE REMOVAL AND THE RECOVERY OF SOLVENT REMAINDERS FROM LIQUIDS, PARTICULARLY OF SELECTIVE SOLVENTS FROM HYDROCARBON OILS AND THE LIKE

Friedrich Schick, Berlin-Schoeneberg, Germany, assignor, by mesne assignments, to the firm Deutsche Erdol-Aktiengesellschaft, Berlin-Schoeneberg, Germany Application June 8, 1938, Serial No. 212,424
In Germany June 14, 1937

2 Claims. (Cl. 202—64)

This invention relates to a process for the removal and the recovery of solvents from higher boiling liquids, and particularly to the removal and recovery of selective solvents from higher boiling hydrocarbon oils or the like.

It is known in the art that the recovery of solvent remainders from higher boiling liquids, containing, for instance, 1 to 10% of said solvents, causes considerable difficulties. Generally, it is necessary to heat such higher boiling liquids to temperatures which essentially, e. g. by 200° C., exceed the boiling point of the solvent contained therein, and there is an extraordinary slackening of the distillation as the quantity of the solvent in the higher boiling liquid decreases. It has been suggested to use steam or similarly acting means for facilitating the recovery of solvent remainders, but such means are not applicable in many cases, particularly if the solvent, e. g. phenol, is soluble in water or forms azeotropes with steam.

I have found that these difficulties can be avoided, and solvent remainders can be recovered in a continuous process, and essentially without loss, from higher boiling liquids by proceeding as follows.

The higher boiling liquid containing the solvent remainders is spread in very thin layers, and is simultaneously subjected to heating under vacuum to a temperature which is below the boiling point, under said vacuum, of the liquid treated, and does not exceed the boiling temperature, at atmospheric pressure, of the solvent to be recovered by more than 100° C. Thereby, the solvent remainders are evaporated and can be recovered by condensation as described in detail hereinafter.

In carrying out my invention the liquid material to be treated is divided over large surfaces into thin layers, as obtained by causing it to flow over a high layer of Raschig rings having a diameter not over 10 millimeters, which yield in one cubic meter of the evaporating room a surface of about 550 square meters. Other relatively small filling or packing bodies having a similar effect to that of such Raschig rings, may also be used.

The thickness of the layer of the liquid to be treated passing the evaporating space shall not surpass 0.05 mm. in the average. I prefer to use a liquid layer the thickness of which amounts to less than 0.01 mm. Within these limits the thickness of the liquid layers to be used depends on the nature of the solvent to be removed, on the average and the maximum of the distillation temperature, on the quality of the oil residue, especially on its viscosity, on its interfacial tension against the vapor of the solvent, on the stage of the vacuum applied, and the output required from the evaporator.

In the evaporator, I use an absolute pressure which does not amount to more than 40 mm. Hg pressure, and prefer the use of an absolute pressure less than 10 mm. Hg.

The evaporation of the solvent remainders from higher boiling liquids can be effected according to my invention at temperatures which only slightly, for instance by about 30–50° C. and up to 100° C., exceed the boiling temperature, at atmospheric pressure, of said solvent, or even are below said boiling temperature.

The recovery of solvents from higher boiling liquids according to my invention, does not require or include any essential fractionation, as the evaporation of the solvents causes the simultaneous removal of only very limited quantities of the higher boiling liquid, e. g. a small percentage, and my present invention relates to the treatment of mixtures, the main component of which boils at a point considerably higher (in most cases by 50° C. or more) than the boiling point of the solvent to be recovered.

In carrying out my invention an evaporating column filled with Raschig rings of the above mentioned dimensions, may be used. The capacity of such column depends to a certain extent on the relation of the diameter to the height of it. The proportions found to be suitable are between 1:2 and 1:12. Such evaporating column can be used for evaporating the solvents, for instance from mixtures obtained by de-paraffinizing or selectively extracting mineral oils with a proportion of solvent to oil of, for instance, 2 to 3:1. When such mixtures are fed to the column, its capacity is scarcely diminished, provided that the evaporation of the bulk of the portion to be evaporated is effected by preheating, conveniently in a pipe-still, in tube-heaters with direct heating, or in steamheated heat-interchangers.

The column is preferably supplemented by a washing device for retaining any slight quantities of the solvent which may possibly escape by suction. This device can be inserted either in the vacuum stage between the column and a vacuum pump or a steam sucking jet pump, or in the pressure stage behind the vacuum unit. For the recovery of solvents from mineral oils it has proved to be specially suited to use as filling oil in the washing column a part or preferably the whole of the oil to be treated with the solvent.

Through this method the washing oil is charged only very slightly, a specially favourable washing effect thus being reached. Furthermore a separate working up of the used washing oil thus may be dispensed with.

In the drawings Fig. 1 illustrates diagrammatically a column suited for the new process in longitudinal section and Fig. 2 shows a diagram of a total distilling unit.

In Fig. 1 A is a column provided at different places with heating elements B which may be brought to various temperatures increasing downwardly.

The material containing the solvent is fed by a tube C into section J of the column. The chief part of the column A below said section J contains in the section E packing pieces not shown, for instance Raschig rings of 10 millimeters in diameter, said packing pieces resting on intermediate perforated trays H. The rings can be filled in through man-holes not shown.

The space G above the feeding tube C may be packed with Raschig rings of larger diameter, e. g. with such of 25 millimeters in diameter. The evaporated solvent leaves the column A on top at D, the material freed from the solvent at the bottom at F.

For instance a column may be used having a diameter of 100 centimeters and an evaporating length of 400 centimeters. The packing with Raschig rings of 10 millimeters in diameter, each of which is made from iron of 0.5 millimeter thickness then gives a total surface of about 1600 square meters. The outlet room of the column above the inlet place at C is substantially filled only with vapour of the solvent. To the socket D immediately a tube for the top product may be joined. The filling of the room G with Raschig rings of 25 millimeters in diameter is made in order to effect there a separation of the solvent vapour from any portions of the liquid material, which may have been carried with said solvent vapour mechanically.

Regarding now the distilling unit of Fig. 2, the material containing the solvent is heated in a tube-heater 5, passing it through a spiral tube 4, then enters an evaporating column 7 corresponding the column A of Fig. 1, where most of the solvent evaporates already when entering same, whereas the remainder is expelled when the material passes that part of this column which is packed with the Raschig rings of 10 millimeters in diameter. The volatilized solvent then passes from pipe 8 a cooler 10 and is collected when condensed in a receptacle 11 underneath. Any remainders which may yet be left uncondensed enter through tube 13 an oil washer 14, where they are retained. The oil washer 14 is filled with a suitable oil entering it at 15 and leaving it at 18. For conducting the remainders of solvent, which have remained uncondensed in receptacle 11, through the oil washer 14 a steam sucking jet pump 21 for producing a vacuum may be used connected by pipe 16 with the upper end of the oil washer 14. The liquid material freed from solvent leaves the columns 7 at 9.

If it is desired to use the liquid material to be treated for retaining the last traces of the solvent in the oil washer 14, it is passed from tube 1 through a valve 2b to the oil washer 14 entering it at 15, and then is conducted through a valve 19a and a pipe 20 to the tube heater 5 for further treatment in the above described manner. In this case it is possible to proceed in such a manner that not the whole quantity of the liquid material to be treated but only a branched off part of it is first conducted during the continuous process as an absorbing means through the oil washer 14, whereas the other part of this liquid material is conducted directly through a pipe 3 to the entering tube 20 of the tube heater 5.

If, however, another oil is used in the oil washer 14, the whole quantity of the initial oil to be treated is conducted through pipes 1, 3 and 20 directly to the tube heater 5 while valve 2a is open and valve 2b is closed, the oil used for absorbing the remainders of the solvent in the oil washer 14 then being entered through a pipe 17 and a valve 2c at 15. In this case this oil is drawn off at 18 through a valve 19b while valve 19a is closed and is separately freed from the absorbed solvent.

Instead of using a high column as described above, one may employ also a plurality of separate lower vessels arranged the one over the other or side by side, each packed with Raschig rings of 10 millimeters or less in diameter, said vessels being successively passed by the material from which the remainders of the solvent or the like are to be removed. On the other hand a plurality of columns of the kind described may be arranged correspondingly in series.

Obviously, the process and the unit may be utilized also to remove instead of solvent remainders small portions of other components of a mixture if said components have a boiling point considerably below that of the main component.

The following examples give further indications for the dimensions, the capacities, the evaporating outputs, the temperatures, and for other variations of the working conditions in a number of practical applications.

*Example 1*

In a unit worked continuously for selectively treating machinery oil distillate of 15° E°50°C. with phenol containing 5% of water, the resulting phenol containing raffinate and the resulting phenol containing extract are freed from the solvent in an evaporating column according to Fig. 1.

Under a vacuum of 20 millimeters of Hg (absolute) the following temperatures were needed:

|  | °C. |
|---|---|
| The mixture enters the column with | 130 |
| Centre of the column | 150 |
| Bottom end of the column | 180 |
| Top outlet of the column | 110 |

The raffinate containing about 20% of an aqueous solution of phenol with 5% of water and the extract containing about 80% of an aqueous solution of phenol with 5% of water are heated in the tube heater to the temperature of 130° C. mentioned above for the inlet of the column.

The raffinate freed from the phenol in the columns and the extract then show the following remaining contents of phenol.

| Raffinate, percent | | | Extract, percent | |
|---|---|---|---|---|
| 0.009 | 0.000 | 0.003 | 0.009 | 0.009 |
| 0.001 | 0.000 | 0.000 | 0.008 | 0.008 |
| 0.015 | 0.000 | 0.012 | 0.011 | |
| 0.008 | 0.000 | 0.004 | 0.036 | |
| 0.003 | 0.000 | 0.003 | 0.006 | |

(Current data from the continuous operation).

These conditions are reached with an output of 230 kilos of dephenolized raffinate or dephenolized extract, respectively, for each column and hour, corresponding to 300 kilos per square meter or 1 ton for 5000 square meters of surface of the packing bodies.

When tested after continuous operation, for instance after 400 cycles, the phenol distilled off contained only 1% of oil. Generally the oil content of the circulating solvent can be kept in the range of about 5%, even if the boiling interval between the liquid material to be treated and the solvent is much less than 50° C.

The dephenolized raffinate and the dephenolized extract obtained in the above described example show the same properties as those freed from phenol by steaming.

Example 2

A raffinate and an extract both from a transformer oil and both containing 5% of phenol are freed from phenol in the described column under the following conditions:

Vacuum: 40 millimeters Hg, absolute pressure.
Temperature: entrance of the mixture into the column: 100° C.; centre of the column: 150° C.; bottom of the column: 160° C.; top outlet of the column: 90° C.
Throughput: the same as with Example 1.
Initial boiling of the dephenolized transformer oil without vacuum: 240° C.
Boiling point of the phenol without vacuum: 181° C.
Viscosity of the raffinate freed from phenol: $E°_{20°C.}=3.2$.
Viscosity of the extract freed from phenol: $E°_{20°C.}=25$.

The dephenolized finished products contain less than 0.01% of phenol.

Example 3

A raffinate from cylinder oil containing also 5% of phenol is dephenolized in the column under the following conditions:

Vacuum: 40 millimeters Hg absolute pressure.
Temperature: admission of the mixture into the column 150° C.; centre of the column: 170° C.; bottom of the column: 200° C.; top outlet of the column: 130° C.
Throughput: the same as with Example 1.
Viscosity of the raffinate freed from phenol: $E°_{100°C.}=2.7$
Viscosity of the extract freed from phenol: $E°_{100°C.}=5.4$.

The dephenolized final products contain less than 0.01% of phenol.

Example 4

A machine oil raffinate of $E°_{50°C.}=12$ coming from a de-paraffinizing unit and containing 5% of ethylen chloride is freed from the ethylen chloride in the column under the following conditions:

Vacuum: 40 millimeters Hg absolute pressure.
Temperature: admission of the mixture into the column: 130° C.; centre of the column: 140° C.; bottom of the column: 150° C.; top outlet of the column: 50° C.
Throughput: the same as with Example 1.
Initial boiling of the ethylen chloride at 84° C. without vacuum.

The machine oil $E°_{50°C.}=12$ freed from ethylen chloride contains less than 0.01% of ethylen chloride.

(The ethylen chloride distilled off contains 1% of oil.)

About 60% of the ethylene chloride are condensed in the vacuum stage and about 40% in the pressure stage behind the vacuum pump. The portion of ethylen chloride left uncondensed is absorbed in an oil washer in such a way that the exhaust air of the vacuum pump containing yet ethylen chloride is washed in a washing countercurrent column by the total quantity of the initial oil to be treated.

The used oil washer had the following dimensions:

| | Millimeters |
|---|---|
| Length of the washing column | 3,000 |
| Diameter of the washing column | 1,000 |
| Packing: Raschig iron rings | 10 x 10 x 0.5 |

The loss of solvent during evaporation and during condensation, respectively, amounts to 0.18% of the oil.

Having now particularly described and ascertained the nature of my said invention, I declare that what I claim is:

1. A continuous process for the substantially complete removal of solvent remainders from hydrocarbon liquids, said liquids having higher boiling points than said solvents, which comprises heating the liquid material to be freed from the solvent, causing said liquid to flow through an evaporating space in thin layers of not more than .05 millimeter average thickness, by providing within said space a filling of packing bodies of the type of Raschig rings of small diameter; heating the liquid in a plurality of stages of progressively elevated temperatures to a final temperature below the boiling point of said liquid material at the pressure used and not surpassing by more than 100° C. the boiling temperature at atmospheric pressure of the solvent to be recovered as it passes through the filled evaporating space; maintaining in said evaporating space a diminished pressure of not more than 40 mm. Hg pressure; and removing the liquid freed from solvent at the bottom, and the solvent vapors at the top, of the evaporating space.

2. A continuous process for the substantially complete removal of solvent remainders from hydrocarbon liquids, said liquids having higher boiling points than said solvents, which comprises heating the liquid material to be freed from the solvent; causing said liquid to flow through an evaporating space in thin layers of not more than .01 millimeter average thickness, by providing within said space a filling of packing bodies of the type of Raschig rings of small diameter; heating the liquid in a plurality of stages of progressively elevated temperature to a final temperature below the boiling point of said liquid material at the pressure used and not surpassing by more than 100° C. the boiling temperatures at atmospheric pressure of the solvent to be recovered as it passes through the evaporating space; maintaining in said evaporating space a diminished pressure of not more than 40 mm. Hg pressure; and removing the liquid freed from solvent at the bottom, and the solvent vapors at the top, of the evaporating space.

FRIEDRICH SCHICK.